L. A. PETERSON.
CHANGE SPEED GEARING.
APPLICATION FILED JAN. 27, 1910.
988,025.
Patented Mar. 28, 1911.
2 SHEETS—SHEET 1.
Fig. 1.
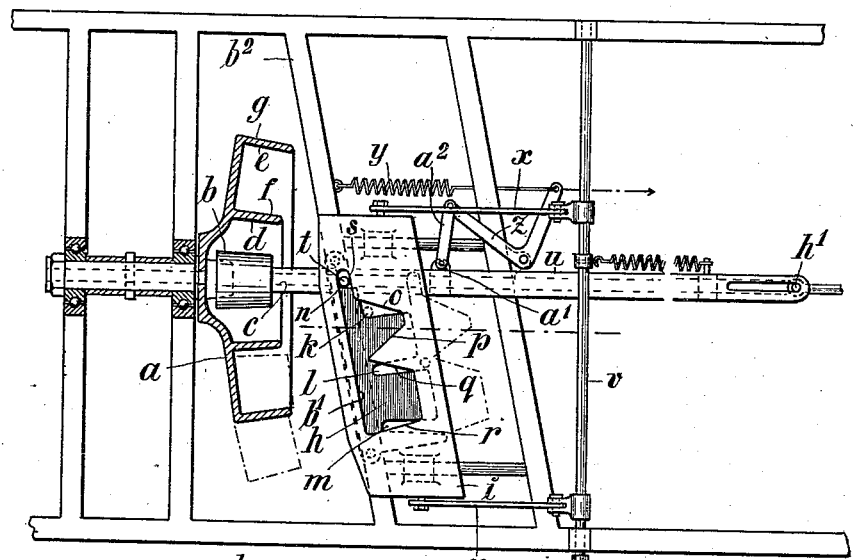
Fig. 2.
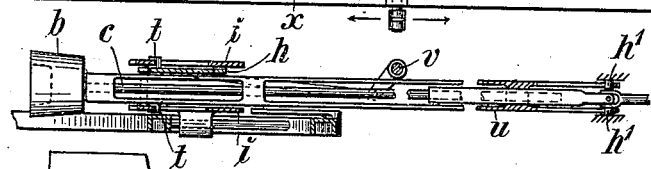
Fig. 3.
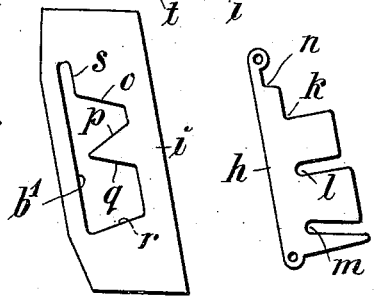
Fig. 4.
Witnesses
Karl Runeskog
Fredr. Nordqist
Inventor
Lars August Peterson
by O. Singer,
Atty.

L. A. PETERSON.
CHANGE SPEED GEARING.
APPLICATION FILED JAN. 27, 1910.
988,025.
Patented Mar. 28, 1911.
2 SHEETS—SHEET 2.
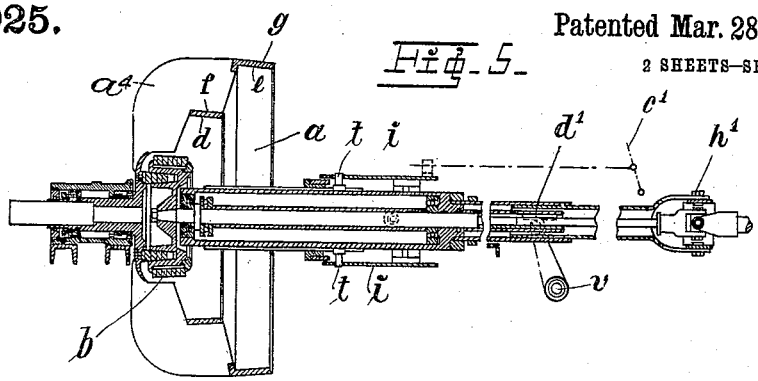
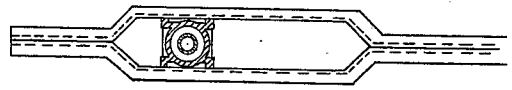
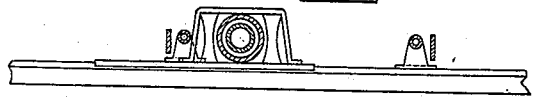
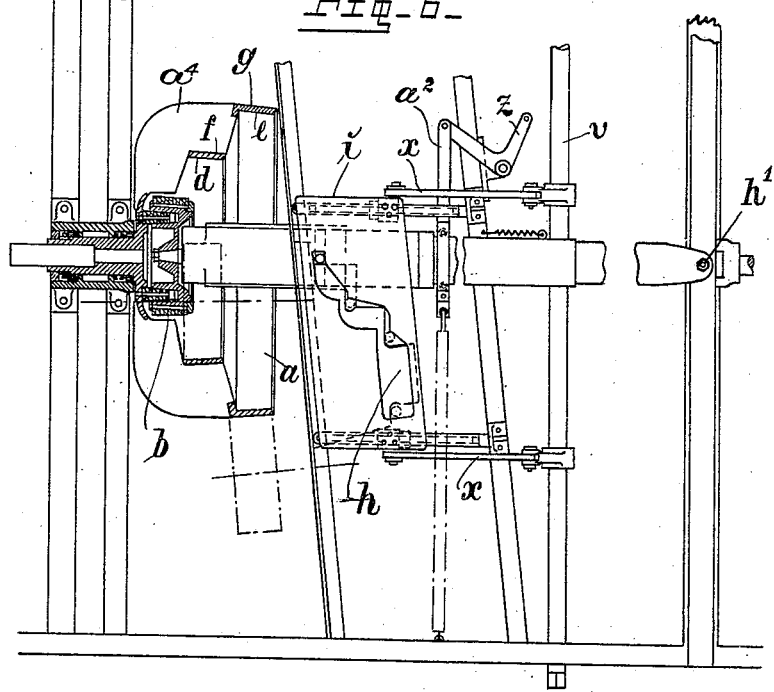
Witnesses
Inventor

UNITED STATES PATENT OFFICE.

LARS AUGUST PETERSON, OF STOCKHOLM, SWEDEN.

CHANGE-SPEED GEARING.

988,025.  Specification of Letters Patent.  Patented Mar. 28, 1911.

Application filed January 27, 1910. Serial No. 540,422.

*To all whom it may concern:*

Be it known that I, LARS AUGUST PETERSON, a subject of the King of Sweden, residing at Stockholm, in the Kingdom of Sweden, have invented new and useful Improvements in Change-Speed Gearing, of which the following is a specification, reference being had to the drawings accompanying and forming a part hereof.

This invention relates to a change speed gearing for automobiles, motor boats and the like.

More particularly the invention relates to gearing of the kind in which a larger and a smaller rotary member, for instance two friction disks, coöperate in such a manner that one of the said members may be thrown into engagement with one or the other of a number of concentric surfaces of the other member and also be brought into central engagement with the same so that both rotate with the same speed.

One object of the invention is to secure a reliable grip or a sufficiently large friction surface in either position of the two members or disks relatively to each other, that is, either the smaller disk engages the larger one at the periphery or nearer the center thereof.

A further object of the invention is to provide a device for reliably locking the two rotary members in position after adjustment.

Further objects will hereinafter appear.

The invention consists, chiefly, in that the friction surfaces of the two rotary members are formed in the shape of cones the apices of which coincide when said members are in interior or exterior engagement with each other. By this means the friction surfaces will be in perfect contact with each other whatever positions the rotary members take up relatively to each other, and, moreover, the friction surfaces may have a large width.

The locking device for securing the two members in position preferably consists of a stationary locking plate or the like having a number of recesses adapted to engage a part connected to the oscillatable friction member, or the shaft carrying the same, and a movable locking plate acting on the said part so as to press the same into one or the other of the recesses in the stationary locking plate and retain the same in position.

The invention further comprises the constructions and combinations of parts hereinafter described.

In the drawings, I have shown, by way of example, two change speed gears embodying the invention. Figure 1 is a plan view, partly in section, of the one embodiment. Fig. 2 is a sectional side elevation of the same embodiment. Fig. 3 is a plan view of the movable locking plate. Fig. 4 is a plan view of the stationary locking plate. Fig. 5 is a longitudinal section of the second embodiment. Fig. 6 is a plan view of the same. Fig. 7 is an end view of the same viewed from the righthand side of Fig. 6, Fig. 8 is a detail showing the guide for the movable locking plate.

Referring to Figs. 1–4 of the drawings, $a$ is a friction disk attached or connected by any suitable gearing to the driving shaft of an automobile, motor boat or the like, and $b$ is a smaller disk adapted to coöperate with the disk $a$. The disk $b$ is attached to a motor shaft $c$ adapted to move longitudinally and swing laterally or to a shaft thus connected to a motor shaft. In the embodiment shown the larger disk $a$ is divided into two compartments and through these compartments into four friction surfaces, viz. two inner ones $d$ and $e$ and two outer ones $f$ and $g$. Moreover, the two disks may be thrown into the central engagement with each other shown in the drawing. The shaft $c$ is journaled in a frame $u$ adapted to swing about and move longitudinally on a fixed pin $h'$. If the said pin is supposed to represent the point into which the apices of the cones formed by the two disks coincide, the friction surfaces $d$, $e$, $f$, $g$ should be placed along the segment described by the swingable disk $b$, when swinging about the point $h'$. All the friction surfaces form conical surfaces the apices of which meet in the point $h'$. By this arrangement the coöperating friction surfaces will always be in a perfect engagement with each other to their entire width, in whatever positions the disks be placed relatively to each other and whatever widths the friction surfaces may have.

It is easily understood that the disk $b$ may be brought into frictional engagement with the surface $d$ or $e$, respectively, by the shaft $c$ being moved backward and thereupon swung laterally. In the example shown these two positions correspond to forward running. From the engagement with the surface $e$ the disk $b$ may be thrown into engagement with the surface $f$ by a slight lateral movement of the shaft $c$, and by the said shaft being first moved backward and thereupon laterally outward, forward and inward the disk $b$ may be brought into engagement with the outermost friction surface $g$. The two last-mentioned positions correspond to backward running.

For locking the two friction disks in position two locking plates are provided, viz. the stationary locking plate $h$ and the movable locking plate $i$ (see also Figs. 3 and 4). The stationary locking plate $h$ (Fig. 4) has three recesses $k$, $l$, $m$ corresponding to the friction surfaces $d$, $e$, $f$, $g$ of the friction disk $a$ and one recess $n$ corresponding to the central engagement. The movable locking plate $i$ (Fig. 3) has an aperture forming an oblique edge $o$ corresponding to the friction surface $d$, two oblique edges $p$ and $q$ corresponding to the friction surfaces $f$ and $e$, respectively, an oblique edge $r$ corresponding to the friction surface $g$ and an edge $s$ corresponding to the central engagement. When the two friction disks are in central engagement, the edge $s$ of the movable locking plate is kept pressed against a pin $t$ projecting from the frame $u$. By this means the pin $t$ is forcibly retained in the recess $n$, by which a strong and reliable engagement is secured.

If it be desired to throw the swingable friction disk $b$ into frictional engagement with the friction surface $d$, the movable locking plate $i$ is first moved backward by turning the shaft $v$ which is connected through rods $w$ to the plate $i$. When the plate $i$ is moved backward, the edge $b'$ thereof acts on the pin $t$ which is thus caused to slide backward along the edge of the recess $n$. Finally, the pin loses its support against its sliding surface and falls into the recess $k$. This movement is caused either by hand or through the action of the spring $y$ acting on the angle lever $z$. The lever $z$ is adapted to swing about a fulcrum $a'$ and is connected through a link $a^2$ to the frame $u$ forming bearings for the shaft $c$. When the pin $t$ has entered the recess $k$, the plate $i$ is moved forward, whereby the oblique edge $o$ is pressed against the pin $t$ so that a reliable engagement is obtained.

If the friction disk $b$ is to be thrown into engagement with either of the friction surfaces $f$ or $e$, the plate $i$ is first moved backward by which the pin $t$ is pressed backward by the edge $b'$ until the pin slides into the recess $l$. The pin $t$ is thereupon brought entirely into the said recess by the plate $i$ being moved forward and acting with one or the other of the oblique edges $p$ or $q$ on the pin. Whether the friction disk $b$ is thrown into engagement with one or the other of the surfaces $f$ and $e$ depends on whether the edge $p$ or $q$ of the plate $i$ presses on the pin which, in its turn, depends on whether the frame $u$ is moved by the spring $y$ or is moved in the opposite direction. The throwing of the disk $b$ into frictional engagement with the friction surface $g$ is performed in similar manner. The disk $b$ may be restored into its central position from either lateral position by the plate $i$ being first moved backward and thereupon inward by moving the lever $z$ backward. For moving the friction disk $b$ laterally instead of the lever $z$ a fork or the like engaging a frame $u$ from below may be used, in which fork or the like the frame $u$ may be moved longitudinally at the same time as the fork is movable, for instance, along a bar $b^2$ in the frame and actuated in one direction by a weight or the like. If desired, the edges $o$, $p$, $q$, $r$, $s$ on the plate $i$ may be formed by separate parts which may be adjustable or exchangeable for repair.

In Fig. 2 I have shown two movable plates $i$ firmly connected to each other. Entering the said plates are pins $t$ attached to the upper and lower sides of the frame $u$. The described locking device may, obviously, be employed even in the case of the disk $b$ being stationary and the disk $a$ swingable.

The embodiment of the invention shown in Figs. 5—8 differs from that hereinbefore described particularly in the following respects: According to the latter embodiment the shaft has no oblong slot enabling the same to be moved longitudinally, but instead thereof it consists of tubular parts adapted to slide relatively to each other, as shown at $d'$ in Fig. 5, and the pivot pin $h'$ is not movable relatively to the shaft. The friction surfaces $d$, $e$, $f$, $g$ are not placed along a segment, as shown in Fig. 1, but the said surfaces are displaced in the longitudinal direction of the shaft. On account thereof, the apices of the cones representing the friction disks do not coincide. In the latter embodiment the movable plates $i$ are connected to a pedal $c'$. This arrangement serves to enable the plates $i$ and the shaft to be moved such a distance backward that the friction disks are brought out of engagement with each other, as may be required, for instance, when an automobile is to be rapidly stopped.

Attached to the outer side of the friction disk $a$ are fan wings $a^4$ adapted to produce a strong cooling air current during running, in order to prevent the disks from being heated by friction.

I claim:

1. In a change speed gearing the combination of a rotating member having a plurality of concentric engagement portions, forming truncated cones, said cones having one common apex, a second rotating member, and means for throwing said second member into engagement with each of said portions, and on each side of said portions.

2. In a change speed gearing the combination of a rotating member having a plurality of concentric engagement portions, forming truncated cones, said cones having one common apex in the axis of rotation, a second rotating member and means for throwing said second member into engagement with each of said portions, and on each side of said portions.

3. In a change speed gearing, the combination of a rotating member having a number of concentric engagement surfaces forming cones having a common apex, a second rotating member adapted to be thrown into engagement with the said surfaces, a stationary locking plate having recesses corresponding to the different positions of the said second rotating member, a pin connected to the said second rotating member and adapted to enter into one of the other of the said recesses, and a movable locking plate having oblique edges adapted to keep the pin in adjusted position, substantially as and for the purpose set forth.

4. In a change speed gearing, the combination of a rotating member having a number of concentric engagement surfaces forming cones having a common apex, a second rotating member adapted to be thrown into engagement with the said surfaces, a stationary locking plate having recesses corresponding to the different positions of the said second rotating member, a pin connected to the said second rotating member and adapted to enter into one of the other of the said recesses, and a movable locking plate having oblique edges adapted to keep the pin in adjusted position, said latter locking plate having also an edge adapted to act on the pin in such a manner as to move the same out of engagement with the stationary locking plate, substantially as and for the purpose set forth.

5. In a change speed gearing the combination of a rotating member having a plurality of concentric engagement portions forming truncated cones, said cones having one common apex, a second rotating member, means for throwing said second member into engagement with each of said portions and on each side thereof, a shaft supporting said second member, and a driven shaft pivotally connected with said first named shaft.

6. In a change speed gearing the combination of a rotating member having a plurality of concentric engagement portions forming truncated cones, said cones having one common apex, a second rotating member, means for throwing said second member into engagement with each of said portions and on each side thereof and means for automatically securing said second member in engagement with said portions.

LARS AUGUST PETERSON.

Witnesses:
KOUR DAHLQVIST,
GERHARD NORDSTRAND.

---

Copies of this patent may be obtained for five cents each, by addressing the "Commissioner of Patents, Washington, D. C."